(12) United States Patent
Kim

(10) Patent No.: US 9,139,095 B2
(45) Date of Patent: Sep. 22, 2015

(54) TECHNIQUE FOR CALCULATING DISTANCE TO EMPTY IN ELECTRIC VEHICLE

(75) Inventor: Sangjoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 160 days.

(21) Appl. No.: 13/548,372

(22) Filed: Jul. 13, 2012

(65) Prior Publication Data

US 2013/0253740 A1 Sep. 26, 2013

(30) Foreign Application Priority Data

Mar. 20, 2012 (KR) .................... 10-2012-0028037

(51) Int. Cl.
- *B60L 1/02* (2006.01)
- *B60L 3/12* (2006.01)
- *B60L 11/18* (2006.01)
- *B60W 40/12* (2012.01)
- *B60L 1/00* (2006.01)
- *G06F 17/00* (2006.01)

(52) U.S. Cl.
CPC . *B60L 1/003* (2013.01); *B60L 1/02* (2013.01); *B60L 3/12* (2013.01); *B60L 11/1861* (2013.01); *B60L 2240/34* (2013.01); *B60L 2250/16* (2013.01); *B60L 2260/52* (2013.01); *B60L 2260/54* (2013.01); *B60W 40/12* (2013.01); *G06F 17/00* (2013.01); *Y02T 10/705* (2013.01); *Y02T 10/7005* (2013.01); *Y02T 10/7044* (2013.01)

(58) Field of Classification Search
CPC ............. B60L 1/003; B60L 1/02; B60L 3/12; B60L 11/1861; B60W 40/12
USPC ..................................... 701/123, 22
See application file for complete search history.

(56) References Cited

U.S. PATENT DOCUMENTS

| | | | |
|---|---|---|---|
| 2012/0035843 A1* | 2/2012 | Miura et al. .................. | 701/123 |
| 2012/0116606 A1* | 5/2012 | Ichinokawa ...................... | 701/1 |
| 2012/0179420 A1* | 7/2012 | Gilman et al. ................ | 702/165 |

FOREIGN PATENT DOCUMENTS

| | | | |
|---|---|---|---|
| JP | 10339653 A | | 12/1998 |
| JP | 2001194204 A | | 7/2001 |
| JP | 2010226795 A | * | 10/2010 |
| KR | 10-0558053 | | 2/2006 |

OTHER PUBLICATIONS

JPO english translation of JP 2010-226795.*

* cited by examiner

*Primary Examiner* — Fadey Jabr
*Assistant Examiner* — Yazan A Soofi
(74) *Attorney, Agent, or Firm* — Mintz Levin Cohn Ferris Glovsky and Popeo, P.C.; Peter F. Corless

(57) ABSTRACT

Disclosed is a technique for calculating Distance to Empty (DTE) in an electric vehicle. In the disclosed technique, a learning DTE is calculated by blending an average fuel efficiency stored during a past charge cycle and an average fuel efficiency within a current single charge cycle. Also, a section DTE is calculated using an average fuel efficiency over the certain section within a current single charge cycle. Then, the learning DTE and the section DTE are simultaneously displayed on a cluster.

14 Claims, 6 Drawing Sheets

US 9,139,095 B2

TECHNIQUE FOR CALCULATING DISTANCE TO EMPTY IN ELECTRIC VEHICLE

CROSS-REFERENCE TO RELATED APPLICATION

This application claims under 35 U.S.C. §119(a) the benefit of Korean Patent Application No. 10-2012-0028037 filed Mar. 20, 2012, the entire contents of which are incorporated herein by reference.

BACKGROUND (a) Technical Field

The present invention relates to a technique for calculating a Distance to Empty (DTE) in an electric vehicle. More particularly, the present invention relates to a method for more accurately calculating DTE in an electric vehicle, which enables a separate calculation of DTE reflecting a past accumulated fuel efficiency and DTE reflecting a current driving state and display both DTEs on a cluster.

(b) Background Art

Generally, electric vehicles are powered by one or more motors driven via electricity provided from a battery. In electric vehicles especially, it is essential to know and monitor instantaneous properties of a battery such as the temperature and the State of Charge (SOC). One of the reasons is that DTE based on a remaining capacity of a battery must be reported to a driver while driving by monitoring the SOC of the battery in real-time.

In internal combustion engine vehicles, a driver is informed of a DTE estimated based on the current fuel state. In electric vehicles, however, DTE (remaining travelable distance) is estimated from the current battery energy state, and then is shown on a cluster to the driver so that they can estimate how much further they can travel before they need to recharge the vehicle. As a typical method of calculating DTE of an electric vehicle, DTE is estimated using a relationship between a remaining energy of a high voltage battery and energy consumption rate per distance (i.e., the SOC %).

FIG. 1 is a flowchart illustrating a typical method of calculating DTE. Hereinafter, the typical method of calculating DTE will be described with reference to FIG. 1. The typical method of calculating DTE includes a process of calculating a past average fuel efficiency (S1), a process of calculating a current fuel efficiency (S2), a process of calculating a final fuel efficiency by blending the past average fuel efficiency and the current fuel efficiency (S3), and a process of calculating a DTE from the final fuel efficiency (S4).

Here, the past driving average fuel efficiency is calculated by averaging the fuel efficiency of past driving cycles (e.g., an interval from previous charge cycle to next charge cycle is defined as one driving cycle). The fuel efficiency (km/%) is calculated and stored at the finish of every driving cycle (e.g., the previous driving cycle is finished when charging has completed), and then the stored fuel efficiencies are averaged.

In this case, the fuel efficiency (km/%) of the driving cycle is expressed as an accumulation driving distance of driving cycle (km)/$\Delta$SOC(%), where $\Delta$SOC(%)=SOC(%) immediately after previous charge cycle−SOC(%) just before current charge cycle. Also, when the final fuel efficiency is calculated, DTE is calculated based on the fuel efficiency, and then displayed on a cluster, etc. In this case, DTE can be expressed as final fuel efficiency (km/%)×current SOC (%).

In calculating DTE of an electric vehicle, battery SOC is needed. Particularly, when the fuel efficiency of past driving cycles is calculated, the total battery consumption (corresponding to the above $\Delta$SOC) during cycles is reflected. Particularly, energy consumption of past driving cycles needs to be reflected in calculating DTE, and in this case, the total battery consumption needs to be reflected. However, since the total battery consumption includes energy consumed by an air conditioning apparatus during the past driving cycles, it is difficult to calculate an accurate DTE which excludes the energy consumed by the air conditioning apparatus when it is not being used.

In order to overcome the above limitation, Korean Patent Application No. 10-2011-0135206, filed by the applicant of the present invention on Dec. 15, 2011 discloses a method for calculating DTE of an electric vehicle, which can accurately calculate DTE by removing energy consumed by an air conditioning apparatus to correct a past average fuel efficiency, and can more accurately calculate DTE by reflecting a fuel efficiency according to the operation of the air conditioning apparatus on the fuel efficiency calculated by blending the past average fuel efficiency and the current fuel efficiency to calculate a final efficiency. However, in all the existing DTE calculating methods, since DTE finally calculated is displayed on a cluster as a single numerical value, the fuel efficiency according to the current driving state cannot be accurately monitored.

In other words, as DTE reflecting both the past accumulated fuel efficiency and the current fuel efficiency according to the current driving state is displayed on a cluster as a single numerical value, fuel efficiency information about a current driving region of a certain distance cannot be accurately known during the operation of a vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for calculating Distance to Empty (DTE) of an electric vehicle, which can provide a driver with a more accurate DTE value by calculating N numerical values of DTE including a learning DTE according to a past accumulated fuel efficiency and a section DTE according to a certain section average efficiency of a current driving cycle and displaying them on a cluster simultaneously.

In one aspect, the present invention provides a technique for calculating Distance to Empty (DTE) in an electric vehicle, including: calculating a learning DTE by blending an average fuel efficiency stored during a past charge cycle and an average fuel efficiency within a current single charge cycle; calculating a section DTE using an average fuel efficiency over a certain section within a current single charge cycle; and simultaneously displaying the learning DTE and the section DTE on a cluster.

In an exemplary embodiment, the calculating of the learning DTE may include: calculating a past driving average fuel efficiency (R0); calculating an air conditioning average energy consumption rate (R_AC) during past driving; calculating a past driving average fuel efficiency (R1) from the past driving average fuel efficiency (R0) and the air conditioning average energy consumption rate (R_AC), assuming an air conditioning apparatus is unused; calculating a current driving fuel efficiency (R2); blending the past driving average fuel efficiency (R1) and the current driving fuel efficiency (R2); and calculating a final learning DTE from a driving fuel efficiency (R3) obtained by the blending of the past driving average fuel efficiency (R1) and the current driving fuel efficiency (R2).

In another exemplary embodiment, the blending of the past driving average fuel efficiency and the current driving fuel efficiency may include calculating the driving fuel efficiency (R3) using a weighted average method in which weighted values are applied to the past driving average fuel efficiency (R1) and the current driving fuel efficiency (R2).

In still another exemplary embodiment, the calculating of the final learning DTE from the driving fuel efficiency (R3) obtained by the blending may include: converting current power consumed by the air conditioning apparatus into a fuel efficiency (R4) corresponding to vehicle driving; calculating a final fuel efficiency (R5) that reflects the fuel efficiency (R4) corresponding to the vehicle driving based on the driving fuel efficiency (R3) obtained by the blending; and calculating the final learning DTE from the final fuel efficiency (R5).

In yet another exemplary embodiment, the calculating of the section DTE may include: calculating a driving average fuel efficiency (R0) over a certain section; calculating an air conditioning average energy consumption rate (R_AC) over the certain section; calculating a driving average fuel efficiency (R1) over the certain section (e.g., of travel) from the driving average fuel efficiency (R0) over the certain section and the air conditioning average energy consumption rate (R_AC) over the certain section, assuming an air conditioning apparatus is unused; converting current power consumed by the air conditioning apparatus into a fuel efficiency (R3) corresponding to vehicle driving; calculating a final fuel efficiency (R4) over a certain section from the driving average fuel efficiency (R1) over the certain section and the fuel efficiency (R3) corresponding to the vehicle driving; and calculating a final section DTE from the final fuel efficiency (R4).

In still yet another exemplary embodiment, the driving average fuel efficiency (R1) over the certain section obtained by assuming the air conditioning apparatus is unused may be calculated from map data in which the driving average fuel efficiency (R0) over the certain section and the air conditioning average energy consumption rate (R_AC) over the certain section are inputted.

In a further exemplary embodiment, the calculating of the final fuel efficiency (R4) over the certain section may be performed by subtracting the fuel efficiency (R3) corresponding to the vehicle driving from the driving average fuel efficiency (R1) over the certain section. The final section DTE may be calculated by multiplying the final fuel efficiency (R4) by a value obtained by subtracting a set value from a current battery State Of Charge (SOC).

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
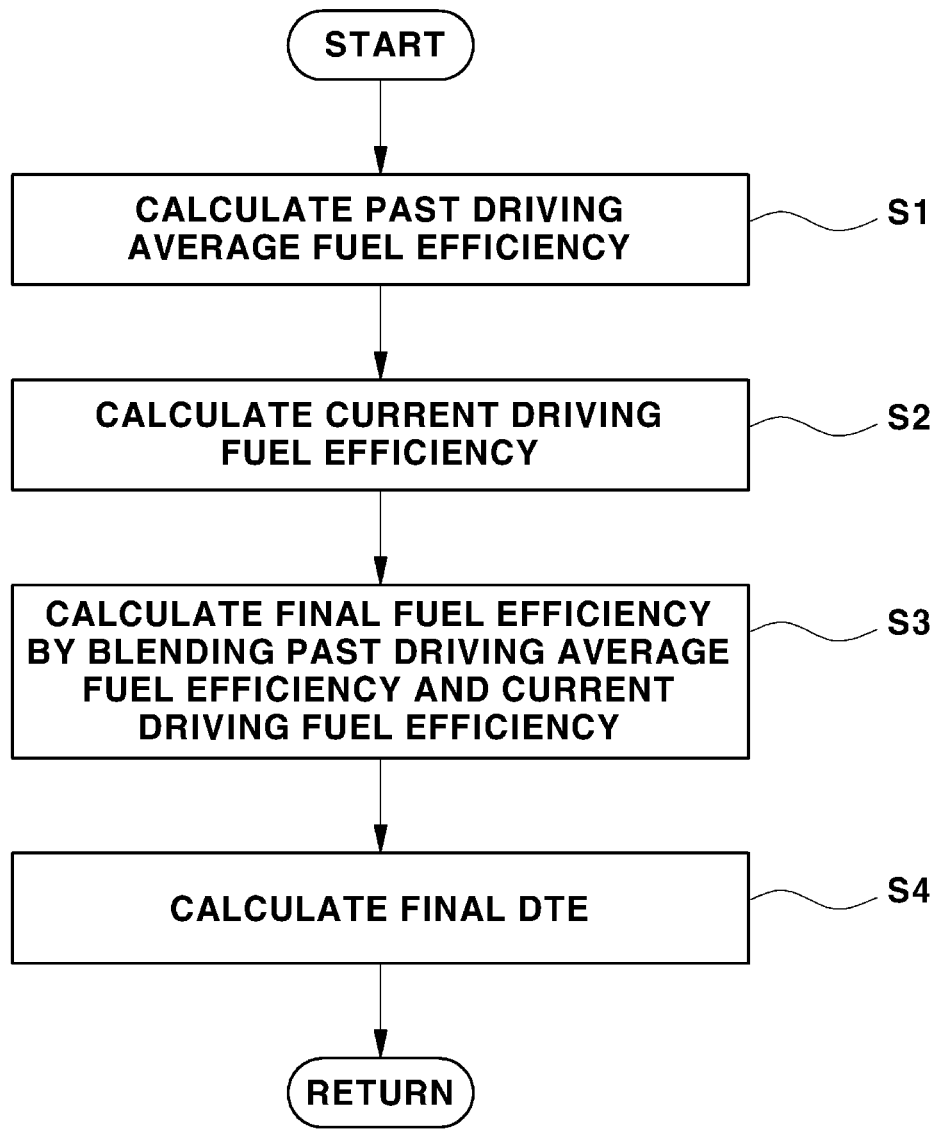
FIG. 1 is a flowchart illustrating a conventional method for calculating Distance to Empty (DTE)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

The above and other features of the invention are discussed infra. Hereinafter, exemplary embodiments of the present invention will be described in detail with reference to the accompanying drawings.

The present invention relates to a technique for calculating Distance to Empty (DTE) of an electric vehicle, which can simultaneously display N numerical values of DTEs including a learning DTE calculated using a past accumulated average fuel efficiency during past charge cycles and a section DTE calculated using a certain section average efficiency during a current charge cycle on a cluster.

Figure 2A:
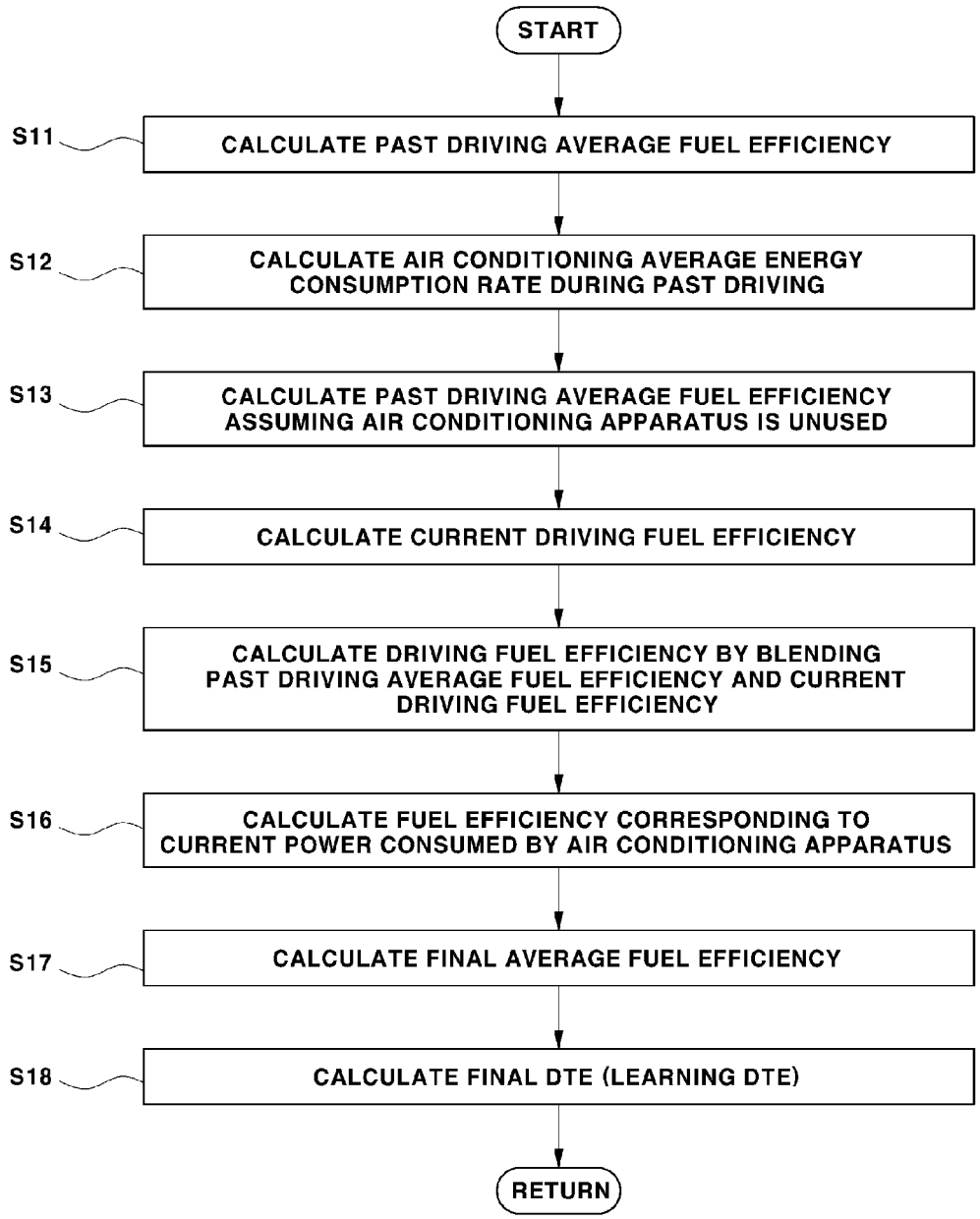
FIGS. 2A and 2B are flowcharts illustrating a method for calculating DTE of an electric vehicle according to an exemplary embodiment of the present invention.

As shown in FIG. 2, a process for calculating DTE according to an exemplary embodiment of the present invention may be divided into a learning DTE calculating process and a second DTE calculating process. As shown in FIG. 2, a technique for calculating DTE may include calculating a past driving average fuel efficiency (S11), calculating an average energy consumption rate in an air conditioning apparatus during the past driving cycle (S12), correcting the past driving average fuel efficiency by assuming the air conditioning apparatus is not being used (S13), calculating a current driving fuel efficiency (S14), blending the corrected past driving average fuel efficiency and the current driving fuel efficiency (S15), and calculating DTE from the blended driving fuel efficiency (S16 to S18).

Here, calculation of the DTE from the blended driving fuel efficiency may include calculating a current fuel efficiency corresponding to an amount of power consumed by the air conditioning apparatus (S16), calculating a final fuel efficiency by reflecting the fuel efficiency corresponding to the amount of power consumed by the air conditioning apparatus on the driving fuel efficiency (S17), and calculating DTE from the final fuel efficiency (S18).

As stated above, in order to perform the above calculation processes, a controller may be provided which executes a computer readable medium containing program instructions related to the above method. The controller may include a storage device and a calculation block for performing calculations of each process. In this case, since DTE finally calculated has to be displayed on a cluster, the controller may include a trip computer, or a separate controller for calculating DTE and transmitting DTE to the trip computer. Also, since the controller uses battery SOC information, the controller may be configured to receive the battery SOC information from a battery management system and receive information on an operational state and on/off signals of the air conditioning apparatus from an air conditioning controller.

Hereinafter, the calculation processes of FIG. 2 will be described in detail with reference to FIG. 3.

Past Driving Average Fuel Efficiency Calculation (S11)

Initially, the past driving average fuel efficiency (km/%) R0 may be calculated by averaging fuel efficiencies over a plurality of past driving cycles (e.g., each individual interval from a previous charge cycle to next charge cycle is defined as one driving cycle). The fuel efficiency (km/%) may be calculated and stored at the end of every driving cycle (e.g., previous driving cycle is finished when charging), and then the stored fuel efficiencies may be averaged. In this case, the fuel efficiency (km/%) of the driving cycle may be expressed as accumulation driving distance of a corresponding driving cycle (km)/ΔSOC(%), where ΔSOC(%)=SOC(%) immediately after a previous charge cycle−SOC(%) just before a current charge cycle of the battery.

The fuel efficiency calculated above may be stored in n buffers of a storage device. Since the fuel efficiencies of all driving cycles may be stored in n buffers, the oldest fuel efficiency data may be deleted when a new fuel efficiency data is stored.

A certified fuel efficiency (e.g., a value calculated and inputted through a fuel efficiency test on a corresponding vehicle model) may be stored in one buffer of the storage device, and the past driving average fuel efficiency R0 may be calculated from the fuel efficiency of the driving cycle and the certified fuel efficiency.

For calculation of average fuel efficiency, a weighted average method in which a weighted value is applied to each fuel efficiency may be used. For example, the average fuel efficiency may be expressed as Equation (1).

$$R0 = \{A1 \times a[0] + A2 \times a[1] + A3 \times a[2] + \ldots + An \times a[n-1] + B \times b[0]\} / (A1+A2+A3+\ldots An+B) \quad (1)$$

where R0 is a past driving average fuel efficiency, A1, A2, A3, An and B denote weighted value, a[0], a[1], a[2], and a[n−1] denote fuel efficiencies of each driving cycle, and b[0] denotes a certified fuel efficiency.

Calculation of Average Energy Consumption Rate in Air Conditioning Apparatus During Past Driving (S12)

A past driving air conditioning average energy consumption rate R_AC (%) may be calculated by averaging an energy consumption rate in the air conditioning apparatus during at least one past driving cycle. For example, whenever each driving cycle is finished, the energy consumption rate (%) in the air conditioning apparatus may be calculated and stored, and then the stored energy consumption rates may be averaged to obtain the past driving air conditioning average energy consumption rate R_AC. Here, the air conditioning energy consumption rate of each driving cycle may be defined as energy consumption rate of the air conditioning apparatus with respect to the total battery energy consumption of a corresponding driving cycle.

The rates calculated as above may be stored in n buffers of the storage device. The fuel efficiencies of all driving cycles may be stored in n buffers, and the oldest rate data may be deleted when a new rate data is stored to maintain storage efficiency.

A predetermined value (e.g., 0%) when assuming the air conditioning apparatus is not used may be stored in one buffer of the storage device, and the past driving air conditioning average energy consumption rate R_AC may be calculated using the rate of the driving cycle and the predetermined value. For calculation of the average energy consumption rate, a weighted average method in which a weighted value is applied to each energy consumption rate and the predetermined value may be used. For example, the past driving air conditioning average energy consumption rate R_AC may be expressed as Equation (2).

$$R\_AC = C1 \times c[0] + C2 \times c[1] + C3 \times c[2] + \ldots + Cn \times c[n-1] + D \times d[0]\} / (C1+C2+C3+\ldots Cn+D) \quad (2)$$

where R_AC denotes a past driving air conditioning average energy consumption rate, C1, C2, C3, Cn, and D denote weighted values, c[0], c[1], c[2], and c[n−1] denote the rates of each driving cycle, and d[0] denotes an assumed value when an air conditioning apparatus is not used.

Current Driving Fuel Efficiency Calculation (S14)

The current driving fuel efficiency R2 (km/%) may be calculated from an accumulated driving distance (km) after charging, the SOC (%) immediately after charging, and the current SOC (%). The current driving fuel efficiency R2 may be expressed as Equation (3).

$$R2 = \text{Accumulated driving distance after charging} / (\text{SOC immediately after charging} - \text{current SOC}) \quad (3)$$

Calculation of Current Fuel Efficiency Corresponding to Power Consumption in Air Conditioning Apparatus (S16)

The calculation of the current fuel efficiency (km/%) R4 corresponding to power consumed by the air conditioning apparatus may include calculating a fuel efficiency that can drive a vehicle using power consumed by the air conditioning apparatus when a driver operates the air conditioning apparatus (e.g., the process of converting power consumption into fuel efficiency corresponding to vehicle driving).

The power consumption of the air conditioning apparatus may become power consumed in an air cooling apparatus such as air conditioner compressor and/or an air heating apparatus such as electric heater (e.g., PTC heater). The fuel efficiency corresponding to the power consumption of the air conditioning apparatus may be expressed as Equation (4), which is calculated as table of values obtained by inputting the current power consumed by the air conditioning apparatus.

$$R4 = \text{Func2(Power Consumption of Cooler+Power Consumption of Heater)} \quad (4)$$

where Func2 may be implemented as a table, and may be obtained a table in which fuel efficiency values are predefined according to power consumption.

In the illustrative embodiment of the present invention, the past driving average fuel efficiency may be corrected using the values calculated in the above processes (S13), and the past driving average fuel efficiency and the current driving fuel efficiency may be blended (S15). Thereafter, the final fuel efficiency may be calculated (S17), and then a more accurate final DTE may be calculated therefrom (S18).

Correction of Past Driving Average Fuel Efficiency (S13)

The correcting of the past driving average fuel efficiency may include removing energy consumed by the air conditioning apparatus from the past driving average fuel efficiency $R0$ calculated in the previous process, and may include obtaining a past driving average fuel efficiency (km/%) $R1$ by assuming that the air conditioning apparatus is not used. The past driving average fuel efficiency $R1$ may be expressed as Equation (5), in which the past driving average fuel efficiency $R0$ and the air conditioning average energy consumption rate $R\_AC$ obtained in the above processes are used as input map values.

$$R1 = \text{Func1}(R0, R\_AC) \quad (5)$$

where Func1 may be implemented as a map, and the correction of $R0$ may be performed according to $R\_AC$ (0 to 100%).

Blending of Past Driving Average Fuel Efficiency and Current Driving Fuel Efficiency (S15)

While blending of the past driving average fuel efficiency and the current driving fuel efficiency, the fuel efficiencies obtained in the above processes, particularly, the past driving average fuel efficiency $R1$ (km/%) obtained by assuming the air conditioning apparatus is not used, and the current driving fuel efficiency $R2$ (km/%) may be blended to obtain a fuel efficiency $R3$ (km/%). The fuel efficiency $R3$ (km/%) may be used to calculate a final fuel efficiency $R5$ that reflects current power consumption in the air conditioning apparatus.

Here, the fuel efficiency $R3$ obtained by the above blending process may be an average value of the past driving fuel efficiency $R1$ obtained by assuming the air conditioning apparatus is not used and the current driving fuel efficiency $R2$. In order to calculate the average value, a weighted average technique of applying a weighted value to each fuel efficiency may be used. The fuel efficiency $R3$ may be expressed as Equation (6).

$$R3 = (R1 \times F1 + R2 \times F2)/(F1 + F2) \quad (6)$$

Final Fuel Efficiency Calculation (S17) and DTE Calculation (S18)

The final fuel efficiency (km/%) $R5$ may be obtained by subtracting the fuel efficiency $R4$ corresponding to the current power consumed by the air conditioning apparatus from the blended fuel efficiency $R3$. Thereafter, DTE (km) may be finally obtained from the final fuel efficiency $R5$ and the current battery SOC (%).

The final fuel efficiency $R5$ and DTE may be expressed as Equations (7) and (8).

$$R5 = R3 - R4 \quad (7)$$

$$DTE = R5 \times (SOC - 5) \quad (8)$$

where '5' is a set value, and is changeable.

Thus, since the past driving average fuel efficiency is corrected by removing energy consumed by the air conditioning apparatus and the final fuel efficiency is calculated by reflecting the fuel efficiency, corresponding to current power consumed by the air conditioning apparatus, on the driving fuel efficiency calculated by blending the past driving average fuel efficiency and the current driving fuel efficiency, the learning DTE can be more accurately calculated.

Figure 3:
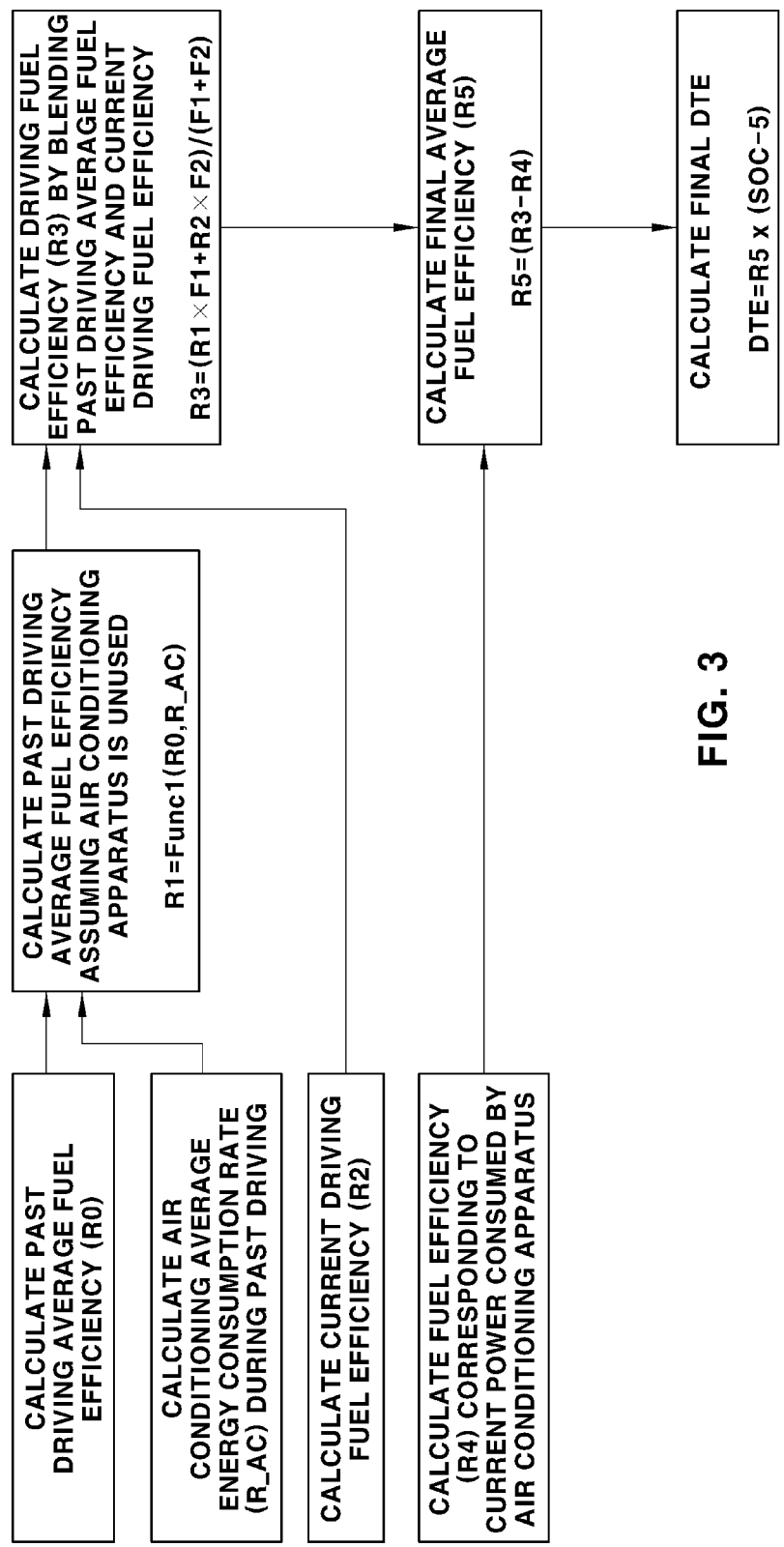
FIGS. 3 and 4 are views illustrating operation processes for calculating learning and section DTEs in a method for calculating DTE of an electric vehicle according to an exemplary embodiment of the present invention.
Figure 4:
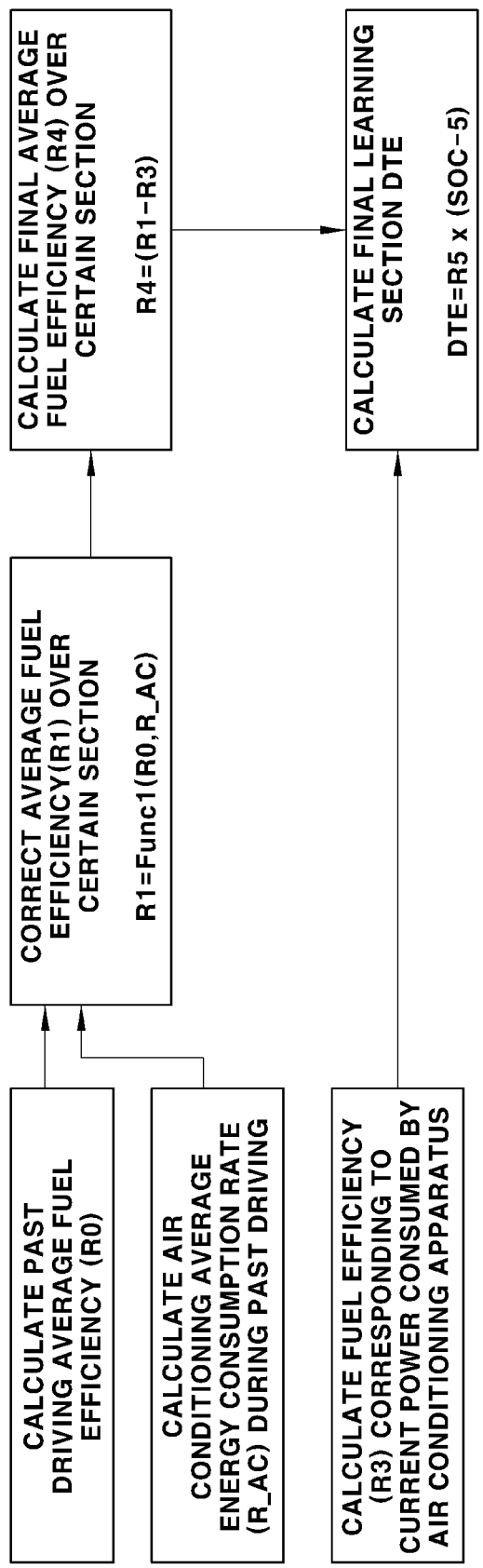
Figure 5:
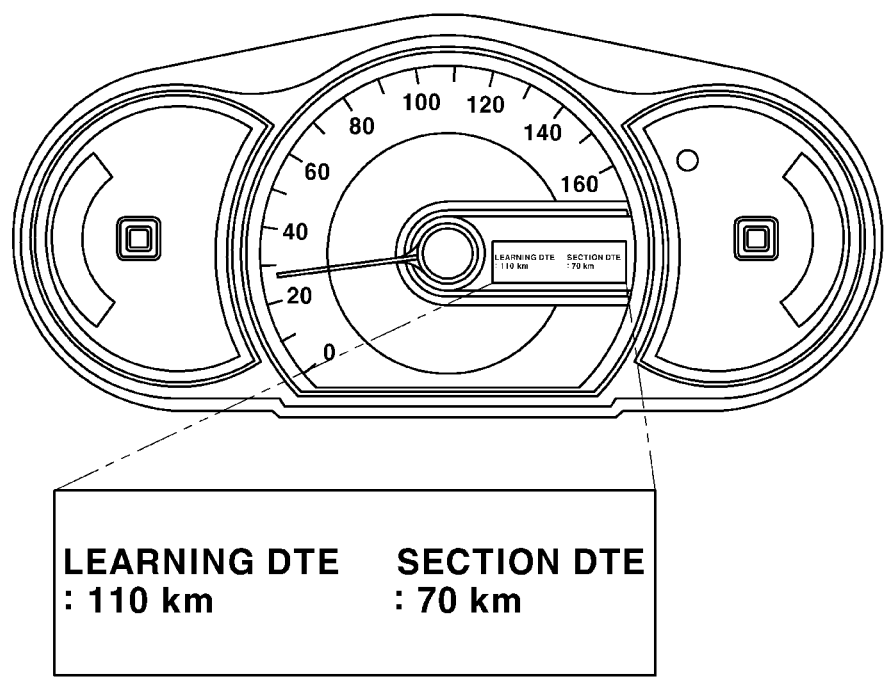
FIG. 5 is a view illustrating learning and section DTEs calculated by a DTE calculating method and displayed on a cluster according to an exemplary embodiment of the present invention.

Hereinafter, a process of calculating a section DTE among DTEs will be described in detail with reference to FIGS. 2 through 4.

Figure 2B:
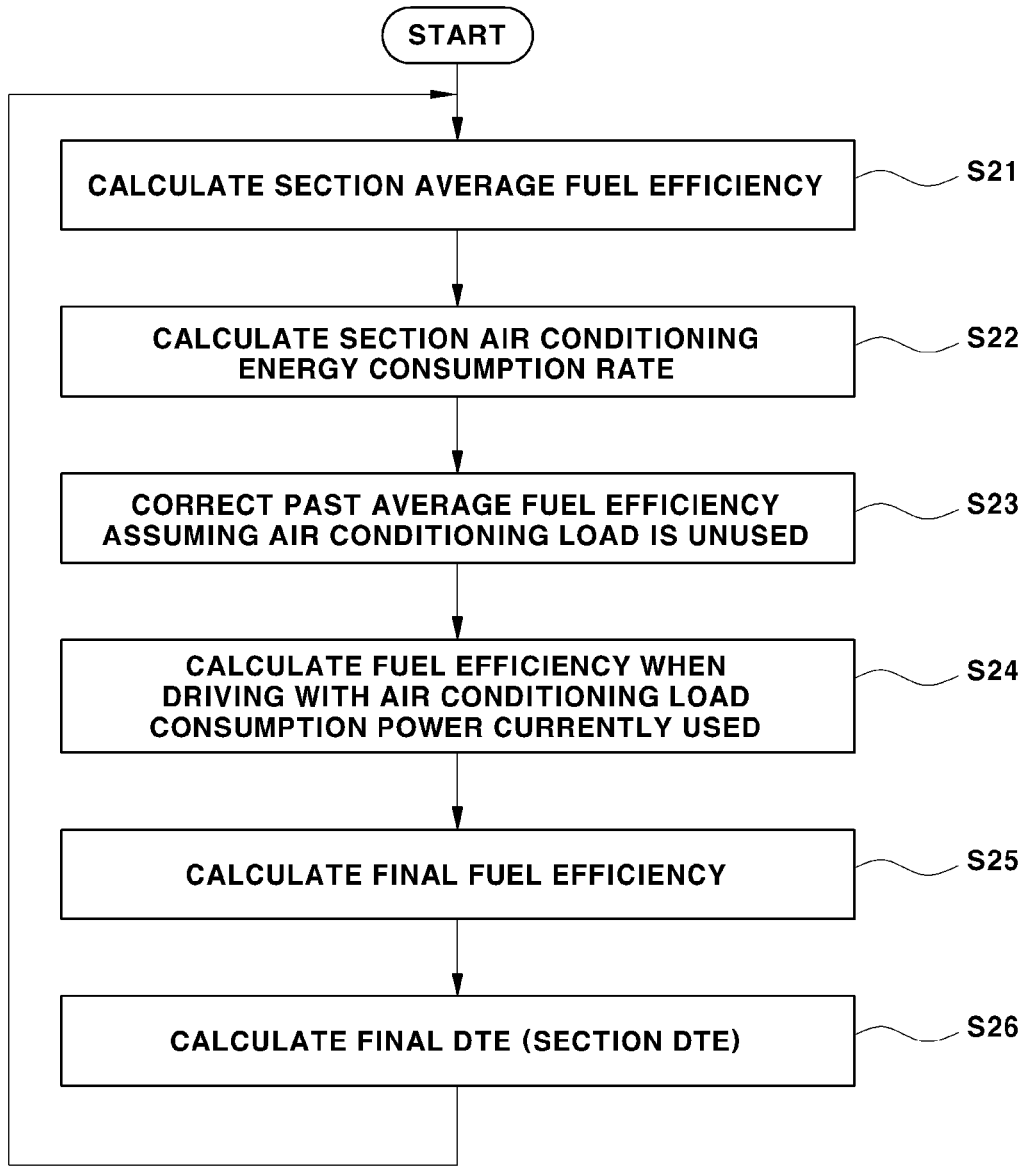

Referring to FIG. 2B, the process of calculating the section DTE using an average fuel efficiency over a certain section within one current charge cycle may include calculating a driving average fuel efficiency $R0$ over a certain section (S21); calculating an average energy consumption rate $R\_AC$ in an air conditioning apparatus over a certain section (S22), correcting and calculating a driving average fuel efficiency $R1$ over a certain section when the air conditioning apparatus is assumed to be unused from the driving average fuel efficiency $R0$ and the air conditioning average energy consumption rate $R\_AC$ (S23), converting current power consumed by the air conditioning apparatus into a fuel efficiency $R3$ corresponding to vehicle driving (S24), calculating a final fuel efficiency $R4$ over a certain section from the driving average fuel efficiency $R1$ over a certain section and the fuel efficiency $R3$ corresponding to the vehicle driving (S25), and calculating a final section DTE from the final fuel efficiency $R4$, which are sequentially performed and will be described in more detail below.

Calculation of Driving Average Fuel Efficiency (R0)(S21)

The average fuel efficiency (km/%) $R0$ over a certain section within one current charge cycle may be obtained by calculating a fuel efficiency over a certain section and setting three buffers within the calculation section (travel 3×A kilometers; A is a set value). Here, old buffer data may be replaced with new data every A kilometers.

The average fuel efficiency calculated above may be stored in n buffers of a storage device. Since the fuel efficiencies of all driving cycles may be stored in n buffers, the oldest fuel efficiency data may be deleted when a new fuel efficiency data is stored.

A certified fuel efficiency (e.g., a value calculated and inputted through a fuel efficiency test on a corresponding vehicle model) may be stored in one buffer of the storage device, and the driving average fuel efficiency $R0$ over a certain section may be calculated from the fuel efficiency of the driving cycle and the certified fuel efficiency. For calculation of the driving average fuel efficiency $R0$ over a certain section, a weighted average method in which a weighted value is applied to each fuel efficiency may be used. For example, the average fuel efficiency may be expressed as Equation (8).

$$R0 = \{A \times a[0] + B \times a[1] + C \times a[2]\}/(A + B + C) \quad (8)$$

where $R0$ is a driving average fuel efficiency over a certain section, A, B, and C denote weighted values in the latest data order, a[0], a[1], and a[2] denote fuel efficiencies of each section driving cycle. Here, since the weighted value is greater in the latest data, a relationship between A, B and C may become A>B>C.

Calculation of Air Conditioning Average Energy Consumption Rate (R_AC)(S22)

Next, the average energy consumption rate (%) R_AC in the air conditioning apparatus during the past driving may be calculated by averaging the energy consumption rate in the air conditioning apparatus during one current charge cycle. In this case, the energy consumption rate (%) may be calculated and stored at the end of every certain section of one current charge cycle, and then the stored rate values may be averaged to obtain the average energy consumption rate (%) R_AC.

Similarly, the rate values calculated above may be stored in n buffers in the storage device. Since the fuel efficiencies of all driving cycles may be stored in n buffers, the oldest fuel efficiency data may be deleted when a new fuel efficiency data is stored.

A predetermined value (e.g., 0%) when assuming the air conditioning apparatus is not used may be stored in one buffer of the storage device, and the air conditioning average energy consumption rate R_AC over a certain section may be calculated using the rate of the driving cycle and the predetermined value. In order to average the air conditioning average energy consumption rate R_AC over a certain section, a weighted average method in which a weighted value is applied to each energy consumption rate and the predetermined value may be used. For example, the air conditioning average energy consumption rate R_AC may be expressed as Equation (9).

$$R\_AC=\{A \times a[0]+B \times a[1]+C \times a[2]\}/(A+B+C) \quad (9)$$

where R_AC is an air conditioning average energy consumption rate over a certain section, A, B, and C denote weighted values in the latest data order, a[0], a[1], and a[2] denote fuel efficiencies of each section driving cycle. Here, since the weighted value is greater in the latest data, a relationship between A, B and C may become A>B>C.

Correction of Driving Average Fuel Efficiency (R1)(S23)

The correcting and calculating of the driving average fuel efficiency R1 over a certain section when the air conditioning apparatus is assumed to be unused from the driving average fuel efficiency R0 and the air conditioning average energy consumption rate R_AC (S23) may include removing energy consumed by the air conditioning apparatus from the driving average fuel efficiency R0 over a certain section, and may include obtaining the driving average fuel efficiency (km/%) R1 over a certain section by assuming that the air conditioning apparatus is not used. As shown in Equation (10), the driving average fuel efficiency R1 may be calculated using the driving average fuel efficiency R0 and the air conditioning average energy consumption rate R_AC.

$$R1=\text{Func1}(R0,R\_AC) \quad (10)$$

where Func1 may be implemented in a map, and the correction of R0 may be performed according to R_AC (0 to 100%). As R_AC increases, the driving average fuel efficiency R0 over a certain section may increase to remove an air conditioning load term.

Conversion of Current Power Consumed by Air Conditioning Apparatus into DTE Fuel Efficiency (R3)(S24)

The calculation of the current fuel efficiency (km/%) R3 corresponding to power consumed by the air conditioning apparatus may include calculating a fuel efficiency that can drive a vehicle using power consumed by the air conditioning apparatus when a driver operates the air conditioning apparatus (e.g., the process of converting power consumption into fuel efficiency corresponding to vehicle driving). The power consumption of the air conditioning apparatus may become power consumed in an air cooling apparatus such as air conditioner compressor and an air heating apparatus such as electric heater (e.g., PTC heater). The fuel efficiency corresponding to the power consumption of the air conditioning apparatus may be expressed as Equation (11), which is calculated as table values obtained by inputting the current power consumed by the air conditioning apparatus.

$$R3=\text{Func2}(\text{Power Consumption of Cooler}+\text{Power Consumption of Heater}) \quad (11)$$

where Func2 may be implemented as a table, and may be obtained a table in which fuel efficiency values are predefined according to power consumption.

In the illustrative embodiment of the present invention, the final fuel efficiency over a certain section may be calculated using the values calculated in the above processes (S25), and then the final section DTE may be calculated using the final fuel efficiency (S26).

Calculation of Final Fuel Efficiency (R4)(S25) and Calculation of Final Section DTE (S26)

The final fuel efficiency (km/%) R4 may be obtained by subtracting the fuel efficiency R3 corresponding to the current power consumed by the air conditioning apparatus from the driving average fuel efficiency R1 over a certain section when the air conditioning apparatus is assumed to be unused. Thereafter, the final DTE (km) may be obtained from the final fuel efficiency R4 and the current battery SOC (%). The final fuel efficiency R4 and the final DTE may be expressed as Equations (12) and (13), respectively.

$$R4=R1-R4 \quad (12)$$

$$\text{Final DTE}=R4 \times (\text{SOC}-5) \quad (13)$$

where '5' is a set value, and is changeable.

Thus, it is possible to provide more accurate DTE information to a driver by calculating the section DTE according to the average fuel efficiency over a certain section within a current single charge cycle in addition to the learning DTE and simultaneously displaying the section DTE and the learning DTE on a cluster.

The present invention can provide the following advantages:

According to embodiments, it is possible to provide more accurate DTE information to a driver by calculating N numerical values of DTE including a learning DTE according to a past accumulated fuel efficiency and a section DTE according to a certain section average efficiency of a current driving cycle and displaying them on a cluster simultaneously. Also, since a driver can compare a current driving pattern with a past driving pattern while viewing the learning and section DTEs, the driver can perform an economical operation of the vehicle.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for calculating Distance to Empty (DTE) in an electric vehicle, comprising:
   calculating, by a controller, a learning DTE by blending an average fuel efficiency stored during a past charge cycle and an average fuel efficiency within a current single charge cycle;

calculating, by the controller, a section DTE using an average fuel efficiency over a certain section within the current single charge cycle; and simultaneously displaying, by the controller, the learning DTE and the section DTE on a cluster, wherein the calculating of the learning DTE comprises:

calculating a past driving average fuel efficiency (R0);

calculating an air conditioning average energy consumption rate (R_AC) during past driving;

calculating a past driving average fuel efficiency (R1) from the past driving average fuel efficiency (R0) and the air conditioning average energy consumption rate (R_AC), assuming an air conditioning apparatus is unused;

calculating a current driving fuel efficiency (R2);

blending the past driving average fuel efficiency (R1) and the current driving fuel efficiency (R2); and calculating a final learning DTE from a driving fuel efficiency (R3) obtained by the blending of the past driving average fuel efficiency (R1) and the current driving fuel efficiency (R2).

2. The method of claim 1, wherein the blending of the past driving average fuel efficiency and the current driving fuel efficiency comprises calculating the driving fuel efficiency (R3) using a weighted average method in which weighted values are applied to the past driving average fuel efficiency (R1) and the current driving fuel efficiency (R2).

3. The method of claim 1, wherein the calculating of the final learning DTE from the driving fuel efficiency (R3) obtained by the blending comprises:

converting current power consumed by the air conditioning apparatus into a fuel efficiency (R4) corresponding to vehicle driving;

calculating a final fuel efficiency (R5) that reflects the fuel efficiency (R4) corresponding to the vehicle driving on the driving fuel efficiency (R3) obtained by the blending; and calculating the final learning DTE from the final fuel efficiency (R5).

4. The method of claim 1, wherein the calculating of the section DTE comprises:

calculating a driving average fuel efficiency (R0) over a certain section;

calculating an air conditioning average energy consumption rate (R_AC) over the certain section;

calculating a driving average fuel efficiency (R1) over the certain section from the driving average fuel efficiency (R0) over the certain section and the air conditioning average energy consumption rate (R_AC) over the certain section, assuming an air conditioning apparatus is unused;

converting current power consumed by the air conditioning apparatus into a fuel efficiency (R3) corresponding to vehicle driving;

calculating a final fuel efficiency (R4) over a certain section from the driving average fuel efficiency (R1) over the certain section and the fuel efficiency (R3) corresponding to the vehicle driving; and calculating a final section DTE from the final fuel efficiency (R4).

5. The method of claim 4, wherein the driving average fuel efficiency (R1) over the certain section obtained by assuming the air conditioning apparatus is unused is calculated from map data in which the driving average fuel efficiency (R0) over the certain section and the air conditioning average energy consumption rate (R_AC) over the certain section are inputted.

6. The method of claim 4, wherein the calculating of the final fuel efficiency (R4) over the certain section is performed by subtracting the fuel efficiency (R3) corresponding to the vehicle driving from the driving average fuel efficiency (R1) over the certain section.

7. The method of claim 4, wherein the final section DTE is calculated by multiplying the final fuel efficiency (R4) by a value obtained by subtracting a set value from a current battery State Of Charge (SOC).

8. A non-transitory computer readable medium containing program instructions executed by a processor or controller, the computer readable medium comprising:

program instructions that calculate a learning Distance to Empty (DTE) by blending an average fuel efficiency stored during a past charge cycle and an average fuel efficiency within a current single charge cycle;

program instructions that calculate a section DTE using an average fuel efficiency over a certain section within the current single charge cycle; and program instructions that simultaneously display the learning DTE and the section DTE on a cluster, wherein the program instructions that calculate the learning DTE include:

program instructions that calculate a past driving average fuel efficiency (R0);

program instructions that calculate an air conditioning average energy consumption rate (R_AC) during past driving;

program instructions that calculate a past driving average fuel efficiency (R1) from the past driving average fuel efficiency (R0) and the air conditioning average energy consumption rate (R_AC), assuming an air conditioning apparatus is unused;

program instructions that calculate a current driving fuel efficiency (R2);

program instructions that blend the past driving average fuel efficiency (R1) and the current driving fuel efficiency (R2); and program instructions that calculate a final learning DTE from a driving fuel efficiency (R3) obtained by the blending of the past driving average fuel efficiency (R1) and the current driving fuel efficiency (R2).

9. The non-transitory computer readable medium of claim 8, wherein the program instructions that blend the past driving average fuel efficiency and the current driving fuel efficiency includes program instructions that calculate the driving fuel efficiency (R3) using a weighted average method in which weighted values are applied to the past driving average fuel efficiency (R1) and the current driving fuel efficiency (R2).

10. The non-transitory computer readable medium of claim 8, wherein the program instructions that calculate the final learning DTE from the driving fuel efficiency (R3) obtained by the blending include:

program instructions that convert current power consumed by the air conditioning apparatus into a fuel efficiency (R4) corresponding to vehicle driving;

program instructions that calculate a final fuel efficiency (R5) that reflects the fuel efficiency (R4) corresponding to the vehicle driving on the driving fuel efficiency (R3) obtained by the blending; and program instructions that calculate the final learning DTE from the final fuel efficiency (R5).

11. The non-transitory computer readable medium of claim 8, wherein the program instructions that calculate the section DTE comprises:

program instructions that calculate a driving average fuel efficiency (R0) over a certain section;

program instructions that calculate an air conditioning average energy consumption rate (R_AC) over the certain section;

program instructions that calculate a driving average fuel efficiency (R1) over the certain section from the driving average fuel efficiency (R0) over the certain section and the air conditioning average energy consumption rate (R_AC) over the certain section, assuming an air conditioning apparatus is unused;

program instructions that convert current power consumed by the air conditioning apparatus into a fuel efficiency (R3) corresponding to vehicle driving;

program instructions that calculate a final fuel efficiency (R4) over a certain section from the driving average fuel efficiency (R1) over the certain section and the fuel efficiency (R3) corresponding to the vehicle driving; and program instructions that calculate a final section DTE from the final fuel efficiency (R4).

12. The non-transitory computer readable medium of claim 11, wherein the driving average fuel efficiency (R1) over the certain section obtained by assuming the air conditioning apparatus is unused is calculated from map data in which the driving average fuel efficiency (R0) over the certain section and the air conditioning average energy consumption rate (R_AC) over the certain section are inputted.

13. The non-transitory computer readable medium of claim 11, wherein the program instructions that calculate the final fuel efficiency (R4) over the certain section is performed by subtracting the fuel efficiency (R3) corresponding to the vehicle driving from the driving average fuel efficiency (R1) over the certain section.

14. The non-transitory computer readable medium of claim 11, wherein the final section DTE is calculated by multiplying the final fuel efficiency (R4) by a value obtained by subtracting a set value from a current battery State Of Charge (SOC).

* * * * *